United States Patent
Tollefsrud et al.

(10) Patent No.: US 9,511,644 B2
(45) Date of Patent: Dec. 6, 2016

(54) LIQUID DISPENSING EQUIPMENT WITH ACTIVE SUSPENSION SYSTEM

(71) Applicant: CNH Industrial America LLC, New Holland, PA (US)

(72) Inventors: Aaron R. Tollefsrud, Willmar, MN (US); Bruce G. Bastin, Pennock, MN (US)

(73) Assignee: CNH Industrial America LLC, New Holland, PA (US)

( * ) Notice: Subject to any disclaimer, the term of this patent is extended or adjusted under 35 U.S.C. 154(b) by 57 days.

(21) Appl. No.: 14/489,828

(22) Filed: Sep. 18, 2014

(65) Prior Publication Data

US 2016/0081264 A1    Mar. 24, 2016

(51) Int. Cl.

| | |
|---|---|
| *B60G 15/06* | (2006.01) |
| *A01M 7/00* | (2006.01) |
| *B60G 3/14* | (2006.01) |
| *B60G 17/019* | (2006.01) |
| *B60G 17/027* | (2006.01) |
| *B60G 17/04* | (2006.01) |
| *A01C 23/04* | (2006.01) |

(52) U.S. Cl.
CPC .......... *B60G 15/062* (2013.01); *A01M 7/0042* (2013.01); *A01M 7/0082* (2013.01); *B60G 3/145* (2013.01); *B60G 17/019* (2013.01); *B60G 17/0272* (2013.01); *B60G 17/04* (2013.01); *A01C 23/047* (2013.01); *B60G 2202/312* (2013.01); *B60G 2202/314* (2013.01); *B60G 2202/32* (2013.01); *B60G 2202/413* (2013.01); *B60G 2204/30* (2013.01); *B60G 2300/03* (2013.01); *B60G 2400/5122* (2013.01); *B60G 2500/30* (2013.01); *B60G 2800/01* (2013.01); *B60G 2800/912* (2013.01); *B60G 2800/914* (2013.01)

(58) Field of Classification Search
CPC .. A01C 23/008; A01C 23/047; A01M 7/0042; A01M 7/0082; B60G 17/08; B60G 15/062; B60G 2500/104; B60G 2202/312; B60G 2204/62; B60G 2800/162; B60G 2300/083

See application file for complete search history.

(56) References Cited

U.S. PATENT DOCUMENTS

| | | | |
|---|---|---|---|
| 4,822,063 A | 4/1989 | Yopp et al. | |
| 4,872,702 A * | 10/1989 | Medley | B60G 17/0424 267/64.16 |
| 4,981,309 A | 1/1991 | Froeschle et al. | |

(Continued)

FOREIGN PATENT DOCUMENTS

| | | |
|---|---|---|
| DE | 32 23 263 A1 | 12/1983 |
| DE | 10 2011 116 597 A1 | 4/2013 |

*Primary Examiner* — Paul N Dickson
*Assistant Examiner* — Timothy Wilhelm
(74) *Attorney, Agent, or Firm* — Rebecca L. Henkel

(57) ABSTRACT

Self-propelled liquid dispensing equipment having ground engaging wheels and an active trailing link suspension system in which either suspension struts or air struts control suspension travel. A liquid pressure transducer is connected to a liquid reservoir to provide a control input that varies the assist given by the suspension struts or air strut in direct proportion to the quantity of liquid. A given suspension travel is maintained regardless of the quantity of liquid carried by the equipment.

20 Claims, 4 Drawing Sheets

(56) References Cited

U.S. PATENT DOCUMENTS

| | | | |
|---|---|---|---|
| 5,036,275 A | 7/1991 | Munch et al. | |
| 5,058,868 A * | 10/1991 | Sirven | B60G 17/08 188/313 |
| 5,285,876 A | 2/1994 | Shimizu et al. | |
| 5,366,236 A | 11/1994 | Kuriki et al. | |
| 5,476,161 A | 12/1995 | Tang et al. | |
| 5,755,382 A * | 5/1998 | Skotinkov | A01B 51/026 180/411 |
| 6,092,816 A * | 7/2000 | Sekine | B60G 17/0152 267/64.17 |
| 6,173,974 B1 * | 1/2001 | Raad | B60G 17/017 280/5.514 |
| 6,386,554 B1 * | 5/2002 | Weddle | B60G 17/033 280/124.161 |
| 6,428,024 B1 | 8/2002 | Heyring et al. | |
| 6,454,294 B1 * | 9/2002 | Bittner | A01B 51/026 180/68.4 |
| 6,553,336 B1 | 4/2003 | Johnson et al. | |
| 6,803,530 B2 | 10/2004 | Carlstrom et al. | |
| 6,991,239 B2 | 1/2006 | Schutt et al. | |
| 7,192,033 B2 | 3/2007 | Bolt et al. | |
| 7,222,867 B2 | 5/2007 | Rotz et al. | |
| 7,287,760 B1 * | 10/2007 | Quick | B60G 17/08 280/5.507 |
| 7,661,681 B1 * | 2/2010 | Zork | B60G 9/003 280/5.514 |
| 7,668,645 B2 | 2/2010 | Lu et al. | |
| 2003/0230443 A1 * | 12/2003 | Cramer | B60G 3/20 180/65.51 |
| 2008/0252025 A1 | 10/2008 | Plath | |
| 2012/0153590 A1 * | 6/2012 | Gilbert | F16F 9/0245 280/124.16 |
| 2014/0263766 A1 * | 9/2014 | Venton-Walters | A01G 25/09 239/726 |
| 2014/0358380 A1 * | 12/2014 | Rausch | B62D 33/073 701/49 |

* cited by examiner

LIQUID DISPENSING EQUIPMENT WITH ACTIVE SUSPENSION SYSTEM

BACKGROUND OF THE INVENTION

1. Field of the Invention

The present invention relates to liquid dispensing equipment, and, more particularly, to suspension systems for such equipment.

2. Description of the Related Art

For many years, liquid dispensing equipment has been part of the agricultural field. The liquid dispensing equipment is used to distribute liquid fertilizer and/or insecticides or herbicides onto the ground of a field for agricultural purposes. Usually, such equipment takes the form of a mobile wheeled vehicle with significant clearance height so as to clear crops that have partially matured. The equipment usually consists of a power unit for self propulsion, an operator cab and a liquid reservoir. Liquid is dispensed using articulated booms that are retracted for transport to the field and then extended laterally to distribute the liquid onto the field.

One of the requirements of such a device may be to have a controllable, substantially constant, suspension travel so that the equipment, and thus the spray boom, is at a constant level above the field surface. This is done to ensure uniform distribution and coverage of the material being sprayed.

Many liquids solutions utilize water as a base and are thus relatively dense. As a result, the full and empty weight of the equipment is substantially different and this could be reflected in the variation of suspension travel, thus producing inconsistent coverage.

In an attempt to counter this effect, active suspension systems have been proposed similar to suspension systems in the automotive field. These include a suspension strut mounted within suspension springs and operable, through pressurized hydraulic fluid, to raise or lower the suspension travel. In the prior art, suspension systems have utilized relatively expensive components to physically measure the distance of the frame from the field thus reflecting suspension travel. With systems of this type there is a significant cost of the sensor components and the potential of exposure to the debris and other material normally experienced when traversing a field.

Accordingly, it is an object of the present invention to provide a simplified and reliable way to provide an active suspension for liquid dispensing equipment.

SUMMARY OF THE INVENTION

The present invention provides a simplified active suspension system for liquid dispensing self-propelled equipment. The present invention also provides the simplified active suspension by using a low cost sensor for determining liquid load on the equipment.

In one form, the invention is a suspension system for self-propelled liquid application equipment having a reservoir for liquid and ground engaging wheels. The suspension system includes articulated suspension links for each wheel enabling up and down travel. A spring is connected to the suspension links to urge the suspension system to an extended travel. A suspension strut is connected to the suspension links and is responsive to pressurized fluid inputs to vary the travel of the suspension system. A controller receives control inputs and provides the pressurized fluid input to the suspension strut. A liquid pressure transducer is fluidly connected to the liquid reservoir and provides a control input to the controller proportional to the amount of liquid in the reservoir so that the suspension strut maintains the travel of the suspension system at a given length, irrespective of the amount of liquid in the reservoir.

In another form, the invention is a suspension system for self-propelled liquid application equipment having a reservoir for liquid and ground engaging wheels. The suspension system includes articulated suspension links for each wheel enabling up and down travel. An air strut is connected to the suspension links to urge the suspension system to an extended travel and is responsive to pressurized fluid inputs to vary the travel of the suspension system. A controller receives control inputs and provides the pressurized fluid input to the air strut. A liquid pressure transducer is fluidly connected to the liquid reservoir and provides a control input to the controller proportional to the amount of liquid in the reservoir so that the air strut maintains the travel of the suspension system at a given length, irrespective of the amount of liquid in the reservoir.

In yet another form, the invention is embodied in self-propelled liquid dispensing equipment including a frame, a plurality of ground engaging wheels for ground movement and a power unit supported by the frame and driving at least a portion of the ground engaging wheels. Articulated suspension links are provided for each ground engaging wheel enabling up and down travel relative to the frame. Springs are connected to the frame and to each of the suspension links to urge the suspension system to an extended travel. A suspension strut is connected to at least a portion of the suspension links and is responsive to pressurized fluid inputs to vary the travel of the suspension system. A controller on the frame receives control inputs and provides pressurized fluid to the suspension strut. A liquid reservoir is mounted on the frame for liquid to be applied. A pumping mechanism is fluidly connected to the fluid reservoir for applying liquid to the ground. A liquid pressure transducer is fluidly connected to the liquid reservoir and provides a control input to the controller proportional to the amount of liquid in the reservoir so that the suspension strut maintains the travel of the suspension system at a given length, irrespective of the amount of liquid in the reservoir.

An advantage of the present invention is a simplified and cost effective sensor for determining load in a liquid dispensing system.

Another advantage is that the sensor for an active suspension system is positioned out of the debris path for such equipment traversing a field.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention and such exemplification is not to be construed as limiting the scope of the invention in any manner.

DETAILED DESCRIPTION OF THE INVENTION

Figure 1:
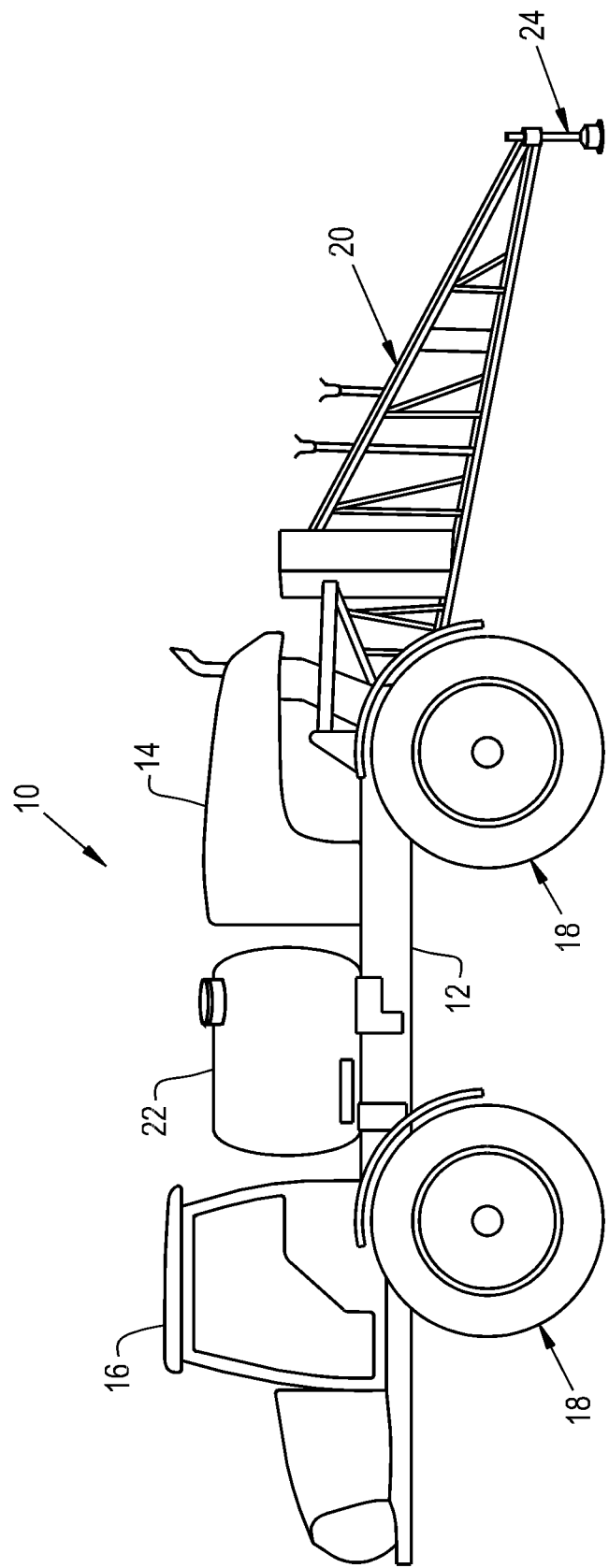
FIG. 1 is a side view of liquid dispensing equipment embodying the present invention.

Referring now to the drawings, and more particularly to FIG. 1, there is shown liquid dispensing equipment 10 including a frame 12 which supports a power unit 14. Power unit 14 is used for propulsion across the ground in a field and, in addition, provides power for auxiliary components of the equipment 10. An operator cab 16 is mounted on frame 12 and provides an operator space and includes controls for liquid dispensing and directional movement of the equipment 10. The equipment 10 includes wheel assemblies 18, each having a relatively large diameter, to enable high clearance through a crop field during the time in which crops are progressing towards maturity. The equipment also includes a spray boom 20, shown in simplified fashion, which receives liquid from a reservoir 22 for dispensing liquid onto the ground through nozzles 24, only one of which is shown.

Figure 2:
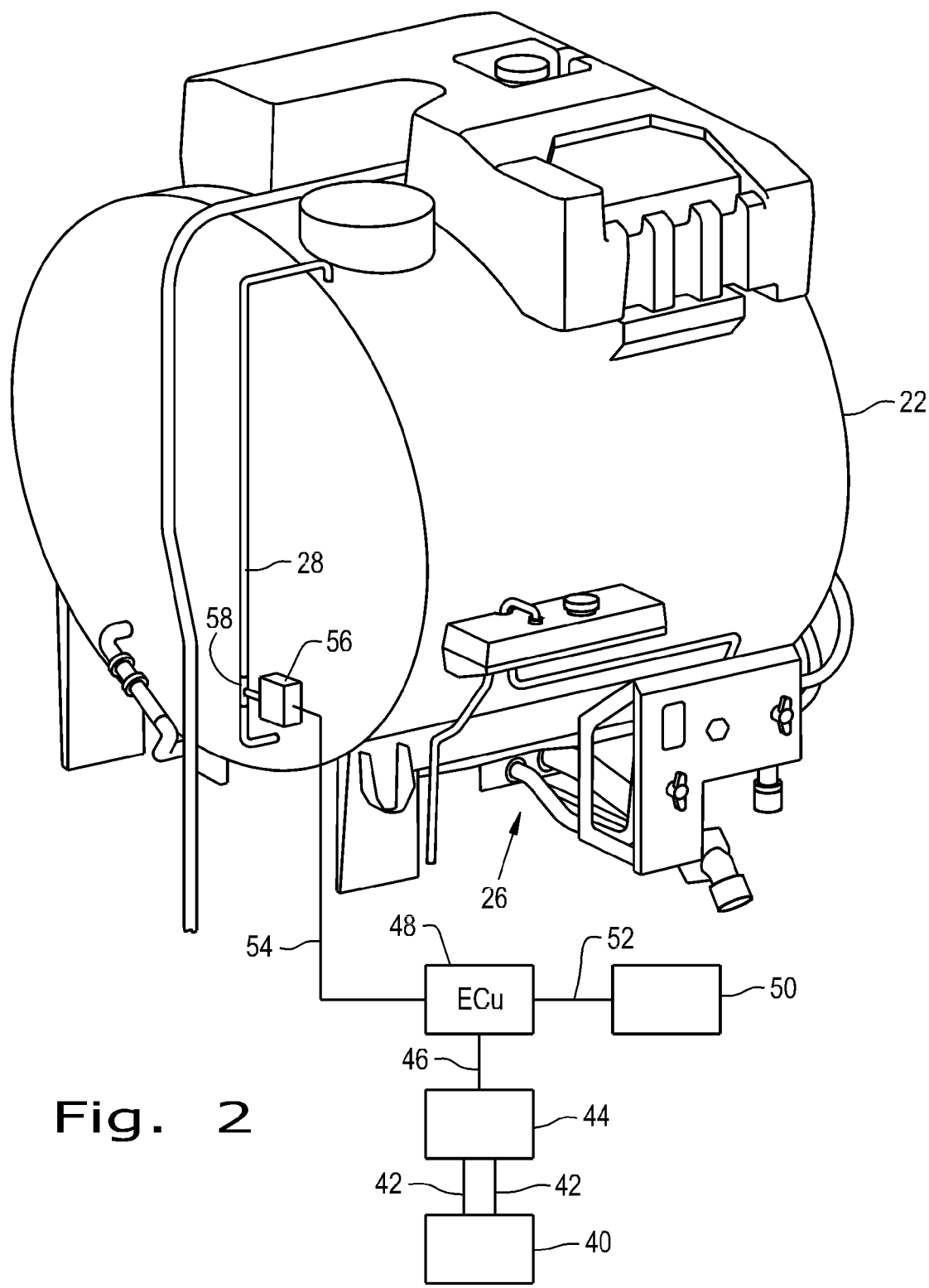
FIG. 2 is a portion of the equipment shown in FIG. 1 showing the interconnection in schematic fashion with the suspension system of FIG. 1.

As shown in FIG. 2, the reservoir 22 has appropriate fill locations and a sight glass tube 28 which extends from the sump of the reservoir 22 to the top and thus provides a visual indication of the liquid within the reservoir 22. A liquid pumping mechanism shown at 26 receives liquid from reservoir 22 and directs it through liquid conduits (not shown) to nozzle 24 for distribution on to a field.

Figure 3:
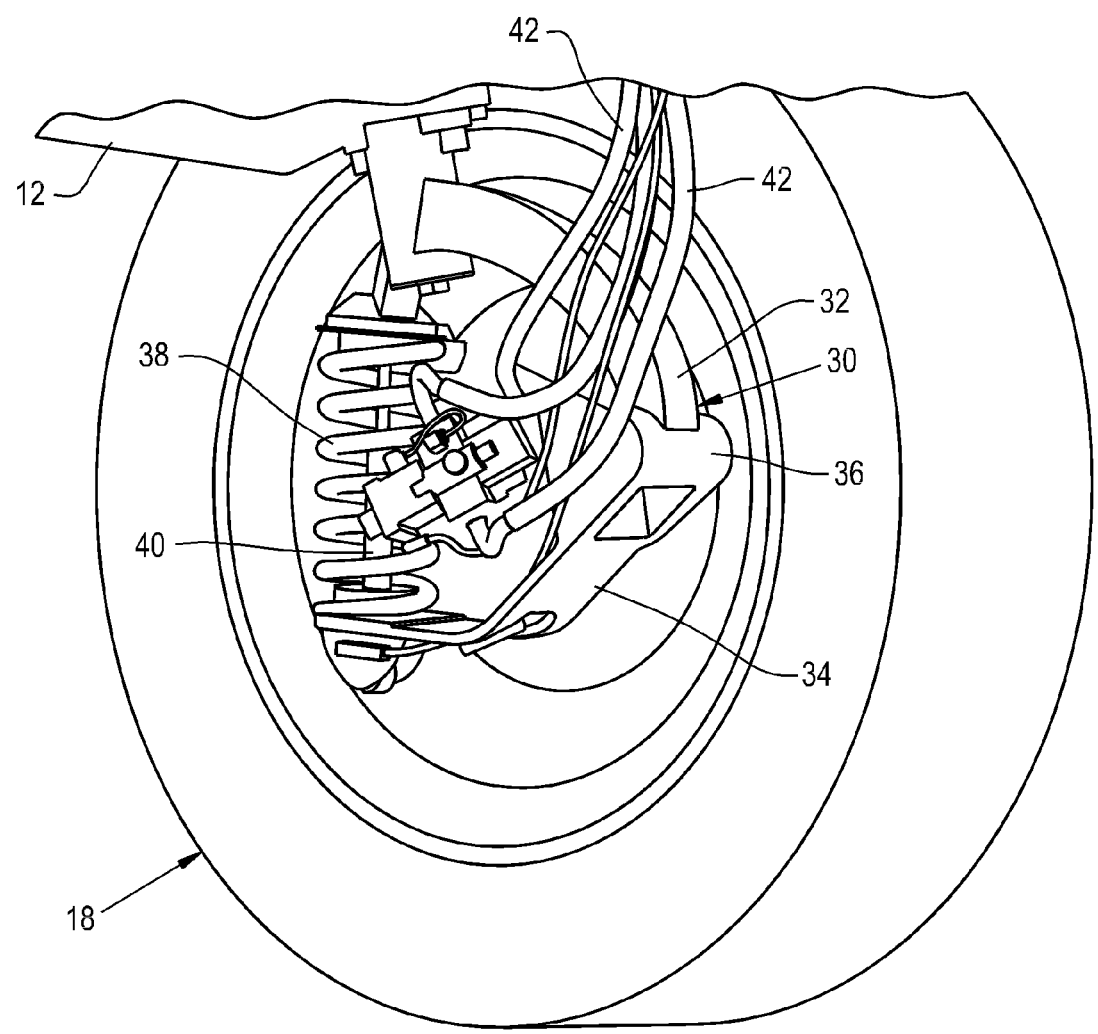
FIG. 3 shows a portion of the suspension system of the equipment shown in FIG. 1.

Referring now to FIG. 3, there is an illustration of the suspension system for the wheel assemblies 18, herein shown for a single wheel. The suspension system includes articulated trailing links 30 made up of an upper link 32 connected to frame 12 and a lower link 34 pivoted to the upper link 32 at 36. The wheel of the wheel assembly 18 is journaled and mounted to the lower link 34 so that it moves relative to the frame 12 as the lower link 34 pivots. A spring 38 abuts lower link 34 and a portion of the base of upper link 32 to provide a yieldable mounting and to support a significant portion of the weight of equipment 10. Positioned within coil spring 38 is a suspension strut 40 that, like active suspension systems, receives pressurized hydraulic flow from lines 42 to increase or decrease the travel of the lower link 34 relative to frame 12 and thus the travel of the suspension system of the equipment 10.

Referring back to FIG. 2, the hydraulic connections 42 extend from suspension strut 40 to a hydraulic pressurization unit 44 that provides a controlled pressure to suspension strut 40, urging it in the direction of suspension travel so that a higher pressure is translated into a larger travel. The hydraulic pressurization unit 44 usually consists of a hydraulic pump and valve mechanism (not shown), responsive to direct the flow from the pump to and from the suspension strut 40. The hydraulic pressurization unit 44 receives a control input via control line 46 from an electronic control unit (ECU) 48 that may also function as the equipment and/or power unit controller. The hydraulic pressurization unit 44 and the ECU are referred to collectively as a controller for the suspension strut 40. The ECU 48 receives additional control inputs via control line 52 providing an operator input control 50 as well as other inputs such as GPS.

In accordance with the present invention, the ECU 48 receives another control sensor signal input through line 54 from a pressure transducer 56 that is fluidly connected to reservoir 22 at or near its lowest point via a T-connection 58 in sight glass tube 28. Although the connection is shown through the sight glass tube 28, it should be apparent to those skilled in the art that it may be provided in other forms to fluidly connect with the reservoir 22.

As stated above, the liquid being dispensed is a dense material and has a significant, but predictable weight. The pressure sensed by transducer 56 ends up being directly proportional to the quantity of liquid, and thus the load, in the reservoir 22. The output of pressure transducer 22 may be in any one of number of forms but, as herein illustrated, is a voltage output directly proportional to the pressure sensed. The pressure sensed by transducer 56 is used as a control input to the ECU 48 to vary the assist given by the suspension strut 40 to the suspension system 30. When the liquid pressure is at its maximum, the load is greatest and the suspension strut 40 applies its maximum assistance to the suspension system 30. Accordingly, as liquid is dispensed and the pressure goes down, the assistance the suspension strut 40 gives to the suspension system 30 is reduced, thus maintaining the travel of the suspension system 30 at a given length, irrespective of the amount of liquid in said reservoir.

Figure 4:
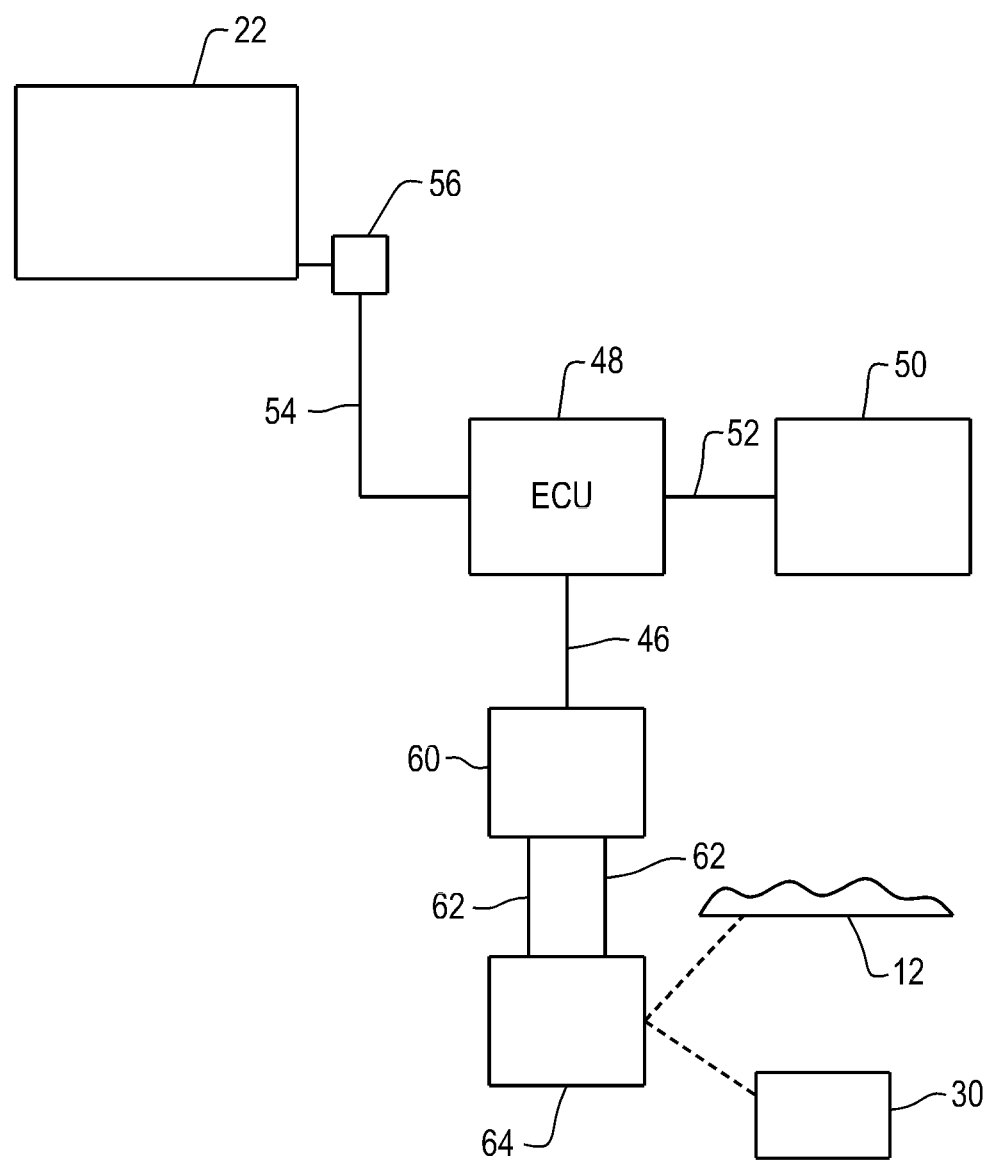
FIG. 4 is a schematic diagram of an alternate embodiment of the present invention.

Referring to FIG. 4, there is shown, in schematic fashion, an alternate embodiment of the present invention. Like reference numerals are used to designate unchanged components. The pressure sensor 56 generates a signal through line 54 to ECU 48 that is proportional to the quantity of liquid in reservoir 22. Additional control inputs are provided from operator input control 50 and other inputs such as GPS. The control signal from ECU 48 is fed by line 46 to a fluid pressurization unit 60. Unit 60 generates controlled pneumatic pressure connected via fluid lines 62 to an air strut 64, sometimes referred to as an air bag or air spring. The fluid pressurization unit 60 and the ECU 48 are referred to collectively as a controller for the air strut 64.

Air strut 64 is positioned between frame 12 and suspension system 30 to support the entire weight of equipment 10 at a suspension travel governed by the pressure maintained by fluid pressure unit 60. Typically, fluid pressurization unit 60 includes an air compressor and valves to direct the compressor output to the air strut 64. The signal from pressure sensor 56 corrects the output from fluid pressurization unit 60 to reflect the depletion of liquid in reservoir 22, and thus the overall weight, as the equipment 10 is operated.

Pressure transducers are inexpensive, simplified devices that enable the initial cost of the system to be reduced. In addition, the pressure sensor is substantially isolated from the environment debris as the unit 10 traverses the ground in a field. This minimizes the potential adverse effect on reliability that would occur on devices that have mechanical parts exposed to the outer portion of the suspension system. The uniformity of the liquid being distributed and the reliability of the pressure sensor 58 produce a highly accurate and reliable way of utilizing an active suspension system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A suspension system for self-propelled liquid application equipment having a reservoir for liquid and ground engaging wheels, said suspension system comprising:
   articulated suspension links for each wheel enabling up and down travel;
   a spring connected to each of said suspension links to urge the suspension system to an extended travel;
   a suspension strut connected to said suspension links and responsive to pressurized fluid inputs to vary the travel of said suspension system;
   a controller receiving control inputs and providing said pressurized fluid input to said suspension strut; and,
   a liquid pressure transducer fluidly connected to the liquid reservoir and providing a control input to a hydraulic pressurization unit proportional to the amount of liquid in the reservoir, whereby the suspension strut maintains the travel of said suspension system at a given length, irrespective of the amount of liquid in said reservoir.

2. The suspension system as claimed in claim 1, wherein said suspension links are trailing links.

3. The suspension system as claimed in claim 1, wherein the spring is a coil spring.

4. The suspension system as claimed in claim 3, wherein the suspension strut is positioned within the coil spring.

5. The suspension system as claimed in claim 1, wherein the signal from said pressure transducer is one of multiple inputs to said controller.

6. The suspension system as claimed in claim 5, further comprising an operator input to said controller.

7. The suspension system as claimed in claim 5, wherein a GPS based signal is one of the inputs to said controller.

8. A self-propelled liquid dispensing equipment, comprising:
   a frame;
   a plurality of ground engaging wheels for ground movement;
   a power unit supported by said frame and driving at least a portion of the ground engaging wheels;
   articulated suspension links for each ground engaging wheel enabling up and down travel relative to said frame;
   a spring connected to said frame and to said suspension links to urge the suspension system to an extended travel;
   a suspension strut connected to at least a portion of said suspension links and responsive to pressurized fluid inputs to vary the travel of said suspension system;
   a controller on said frame receiving control inputs and providing said pressurized fluid to said suspension strut;
   a liquid reservoir on said frame for liquid to be dispensed;
   a pumping mechanism fluidly connected to said liquid reservoir for applying liquid to the ground; and,
   a liquid pressure transducer fluidly connected to the liquid reservoir and providing a control input to said controller proportional the amount of liquid in the reservoir, whereby the suspension strut maintains the travel of said suspension system at a given length, irrespective of the amount of liquid in said reservoir.

9. Liquid dispensing equipment as claimed in claim 8, wherein said suspension links are trailing links connected to said frame.

10. The liquid dispensing equipment as claimed in claim 8, wherein said spring is a coil spring positioned between the frame and said suspension links.

11. The liquid dispensing equipment as claimed in claim 10, wherein the suspension strut is positioned within said coil spring.

12. The liquid dispensing equipment as claimed in claim 8, wherein the liquid pressure signal is one of multiple inputs to said controller.

13. The liquid dispensing equipment as claimed in claim 12, wherein said additional signal input is at least an operator input.

14. The liquid dispensing equipment as claimed in claim 12, wherein said additional control input is at least a GPS input.

15. The liquid dispensing equipment as claimed in claim 8, wherein said liquid pressure transducers senses pressure at or adjacent the lowest portion of said reservoir.

16. The liquid dispensing equipment as claimed in claim 15, wherein said liquid reservoir has a sight glass tube indicating liquid quantity and the pressure connection is a T-connection off of said sight glass tube to said liquid pressure transducer.

17. The liquid pressures dispensing equipment as claimed in claim 8, wherein said pressure sensor has a voltage output proportional to the liquid pressure and said controller includes a valve receiving input proportional to the voltage output of said sensor to vary the height of said suspension strut.

18. A suspension system for self-propelled liquid application equipment having a reservoir for liquid and ground engaging wheels, said suspension system comprising:
   articulated suspension links for each wheel enabling up and down travel;
   an air strut connected to each of said suspension links to urge the suspension system to an extended travel and responsive to pressurized fluid inputs to vary the travel of said suspension system;
   a controller receiving control inputs and providing said pressurized fluid input to said air strut; and,
   a liquid pressure transducer fluidly connected to the liquid reservoir and providing a control input to said controller proportional to the amount of liquid in the reservoir, whereby the air strut maintains the travel of said suspension system at a given length, irrespective of the amount of liquid in said reservoir.

19. The suspension system as claimed in claim 18, wherein the signal from said pressure transducer is one of multiple inputs to said controller.

20. The suspension system as claimed in claim 19, further comprising an operator input to said controller.

* * * * *